Dec. 5, 1939.   A. W. MILLS   2,181,998
RECORD CONTROLLED MACHINE
Filed May 11, 1935   5 Sheets-Sheet 1
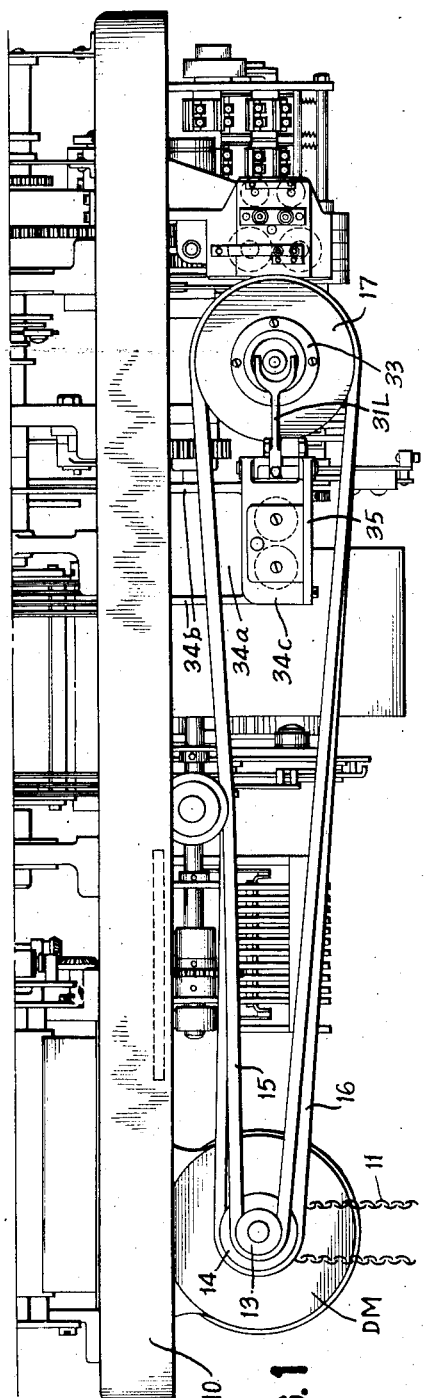
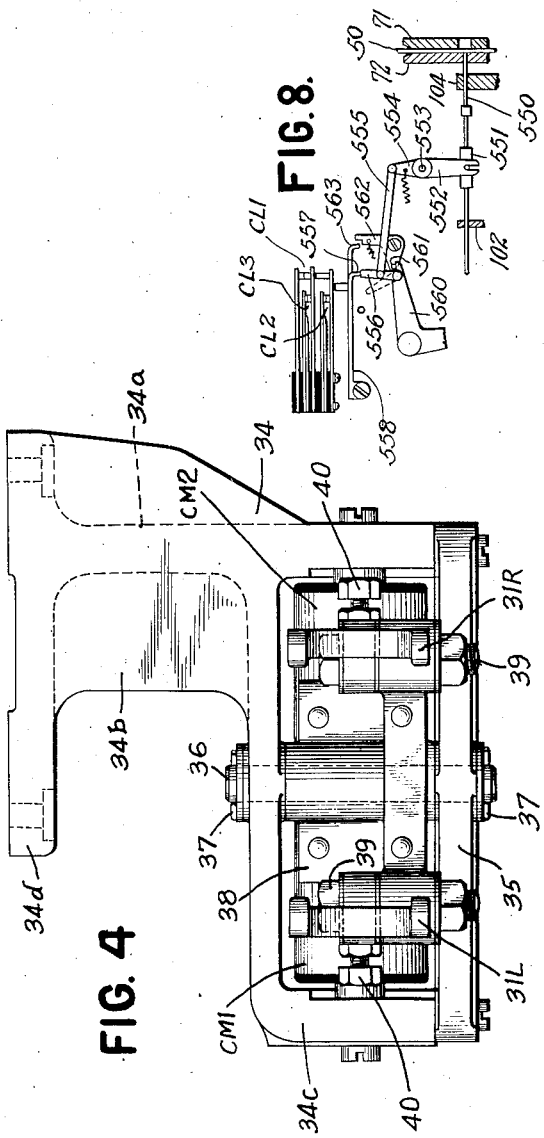
INVENTOR.
Albert W. Mills
BY
ATTORNEY

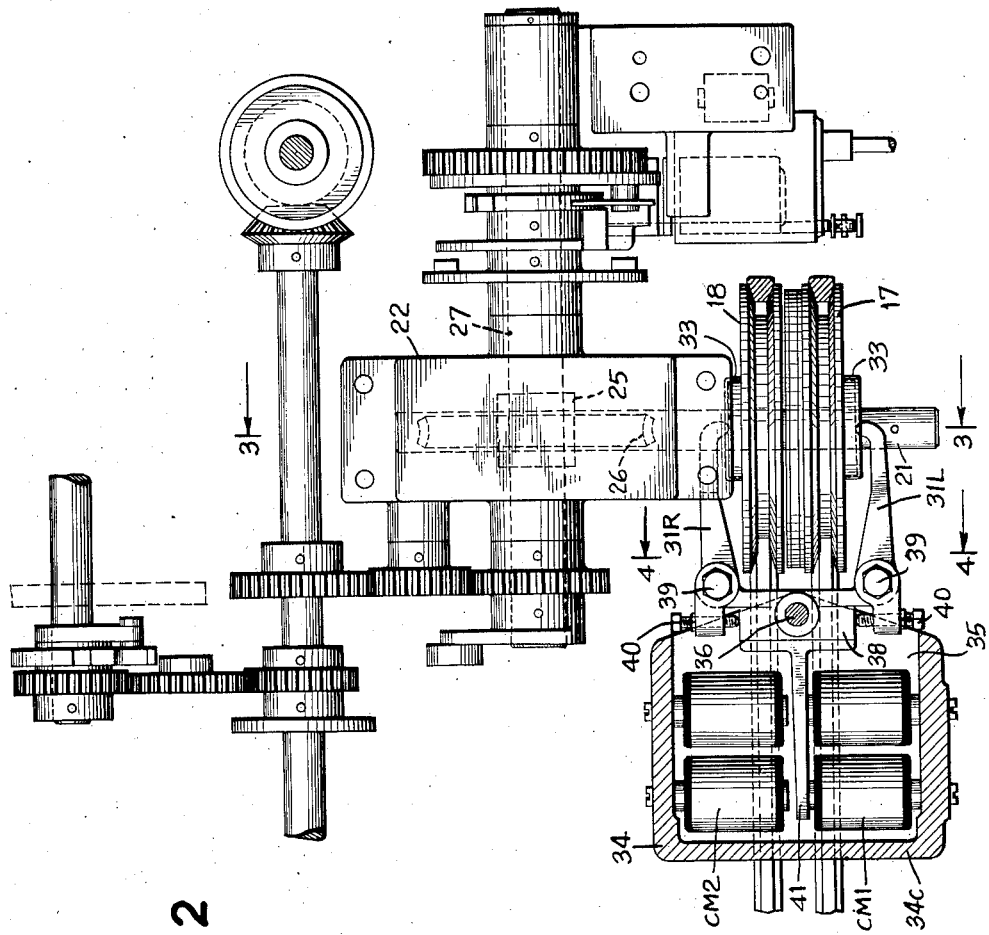
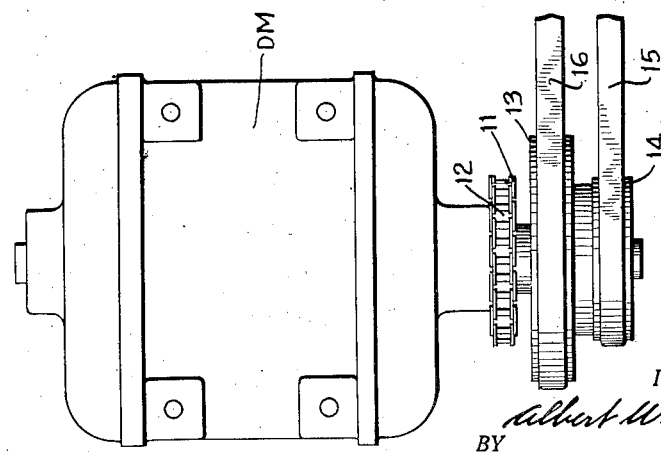
FIG. 2.

Dec. 5, 1939.     A. W. MILLS     2,181,998
RECORD CONTROLLED MACHINE
Filed May 11, 1935     5 Sheets-Sheet 3

INVENTOR.
Albert W. Mills
BY
ATTORNEY

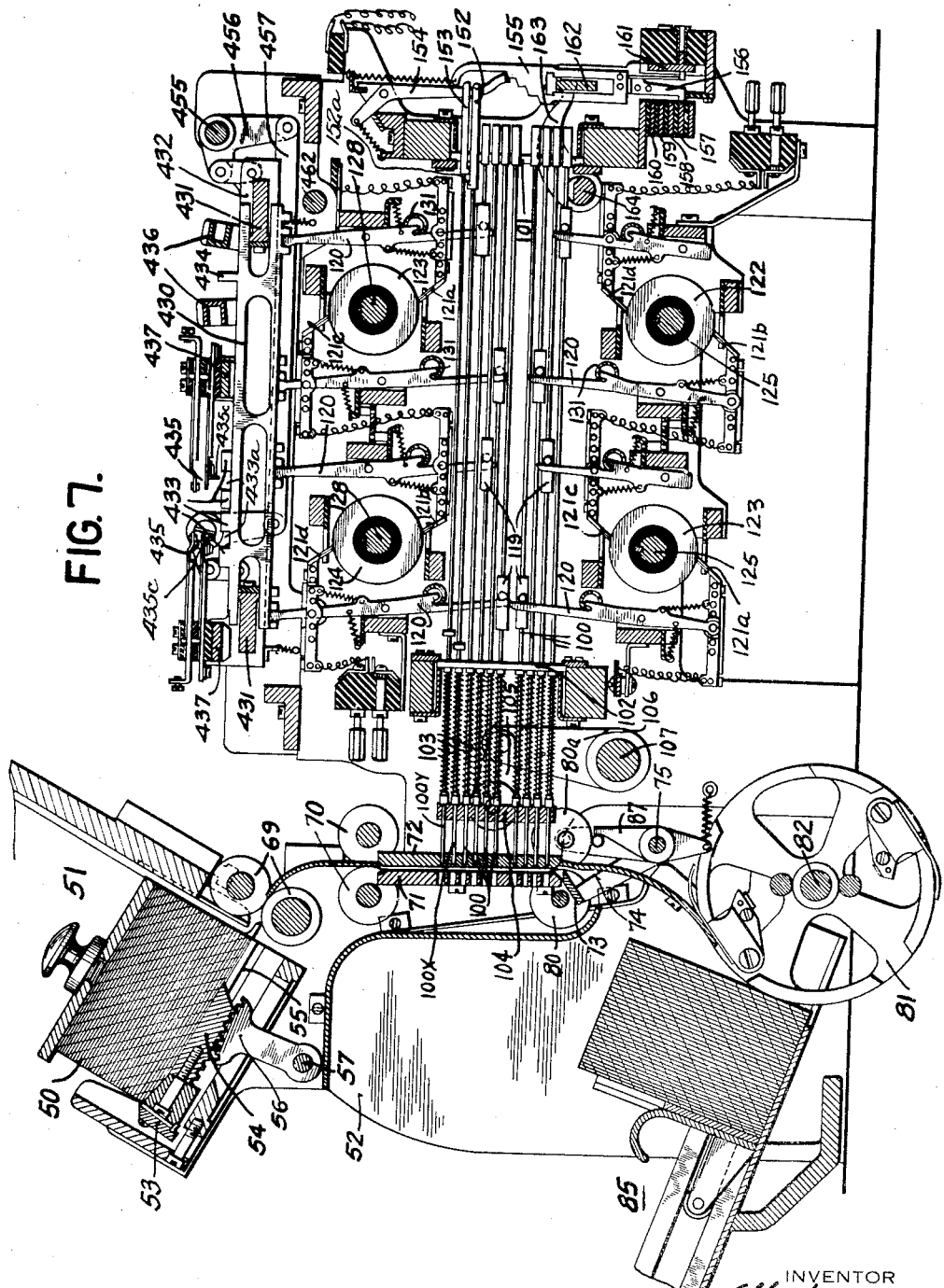

Patented Dec. 5, 1939

2,181,998

UNITED STATES PATENT OFFICE 2,181,998

RECORD CONTROLLED MACHINE

Albert W. Mills, Endicott, N. Y., assignor to International Business Machines Corporation, New York, N. Y., a corporation of New York Application May 11, 1935, Serial No. 20,918

5 Claims. (Cl. 235—61.7)

This invention relates to record controlled accounting and statistical machines.

The object of the invention is to provide novel means for controlling the speed of an accounting and statistical machine to the end that the machine may be operated at the highest speed consistent with reliable operation.

An object is to provide means whereby the speed of the machine is automatically controlled by the accounting and statistical records themselves whereby the speed is automatically changed in accordance with the type of machine operation desired.

Another object is to provide a simple and efficient speed control for accounting and statistical machines which permits the use of a single driving motor running at a constant speed.

A further object is to provide means whereby the speed of the machine is automatically changed according to whether items are to be listed, or merely accumulated, or totals of such items printed.

Another object is to provide means whereby, in a record controlled machine driven by a single motor which also drives a low voltage generator providing the current used for control purposes, the speed of the machine may be varied to suit listing, non-listing, and total printing operation without changing the speed of the motor and thereby adversely affecting the voltage of the generator.

The above objects will best be understood by reference to Patent No. 1,944,667 which shows one form of a recently developed accounting and statistical machine which is now being extensively used.

In commercial embodiments of the machine disclosed in the patent, it has been found desirable to equip the machine with a low voltage generator as it has been found that low voltage current gives best results. This generator is usually driven by the single driving motor provided in this machine which precludes changing the speed of the motor as otherwise the control current delivered by the generator and hence the operation of the machine would be adversely affected. On the other hand, when a single motor is used to drive the machine, the speed of operation of the machine is limited to the highest speed which gives reliable operation of the printing mechanism. As is well known to those skilled in the art, it is possible to operate such machines non-listing at a much higher speed than when printing of items or totals is desired. Heretofore it has been customary, when items are to be merely accumulated, to increase the speed of the motor by controlling in some manner the flow of current through the motor as illustrated by Patent No. 1,762,145 wherein the resistance of the motor shunt field is varied to control the speed. Where a generator is necessary, this last expedient cannot be used as the voltage of the generator would become so high as to be likely to damage the coils of the various control relays and magnets. Of course this defect could in theory be avoided by designing the coils to withstand the higher voltage but in practice this cannot be done as the difference between the speeds for non-listing and listing is so great as to make the operation of the coils uncertain at the lower speed or even inoperative.

Gear shifts set by hand cannot be used satisfactorily as it is still necessary to print totals, even when the machine is operating non-listing, and also to print the group number from the first card of each group, which operations must be performed at low speed. It is out of the question to stop the machine and change the speed by hand between groups because this would considerably slow down the machine so much as to offset any benefits derived that can be derived from operating the machine at the higher non-listing speed.

The purpose of the present invention therefore, is to provide a simple arrangement whereby the machine may be run at the highest speed permissible for each type of operation in order that maximum efficiency may be had. While the present invention will be found most advantageous when used in machines equipped with a generator, it also is extremely useful and capable of increasing the efficiency of machines not so equipped.

Various other objects, advantages, and features of the invention will be specifically pointed out in the following description and claims, or will be seen after a careful study of said description and claims and the attached drawings.

In the drawings:

Fig. 1 is a front elevation of the base of the machine and shows the driving mechanism.

Fig. 2 is a large scale plan view of the driving mechanism.

Fig. 4 is a large scale front elevation of the clutch control mechanism viewed in the direction of arrows 4 in Fig. 4.

Fig. 7 is a vertical section through the machine showing the card feeding and analyzing mechanisms.

Fig. 8 is a detail view showing the mechanism for operating the card lever contacts.

The invention is shown as applied to an electric alphabetical accounting and tabulating machine of the type disclosed in Letters Patent No. 1,944,667 issued January 23, 1934, to John Royden Peirce. This has been done purely for convenience of description as the invention is applicable to other accounting machines without change in its principle of operation and for these reasons it is not desired to be limited to the type of machine chosen to illustrate the invention.

Figure 3:
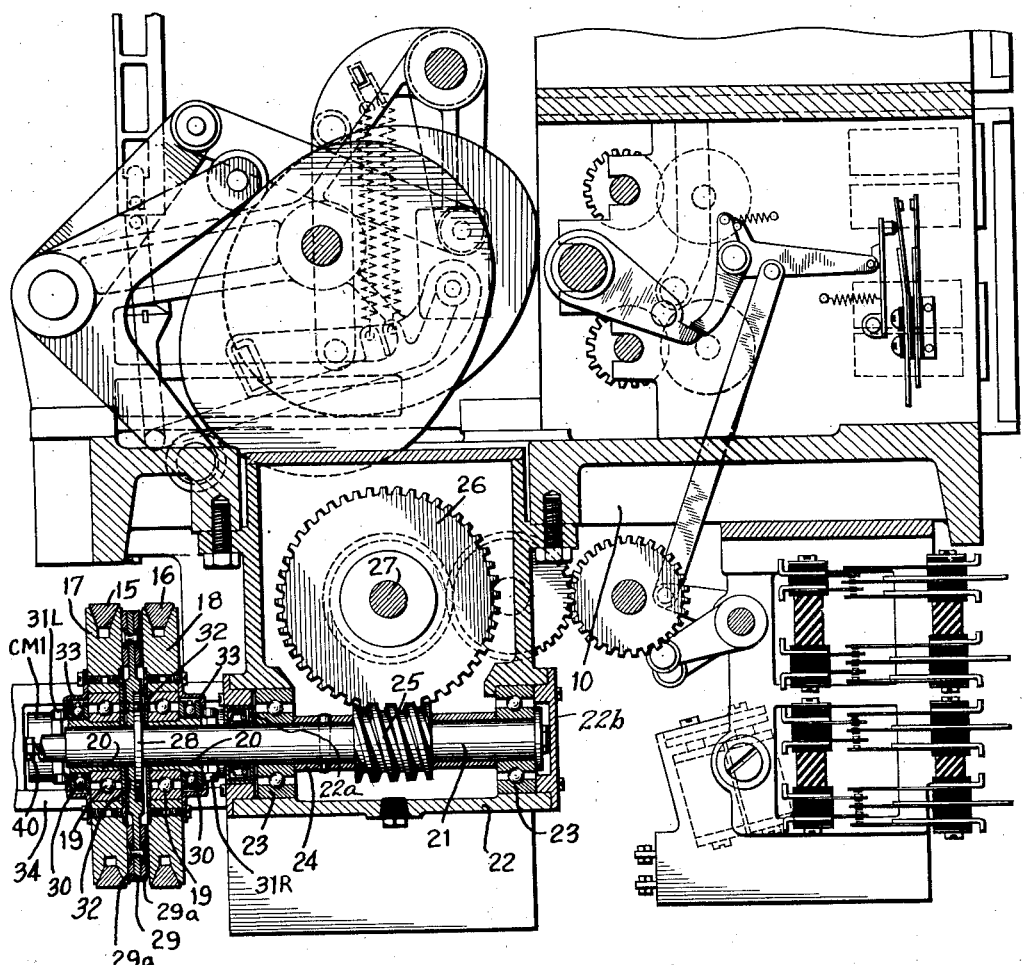
Fig. 3 is a vertical section substantially on the line 3—3 in Fig. 2.

The numeral 10 (Figs. 1 and 3) designates the base of an accounting machine constructed in accordance with the Peirce patent. Upon this base are mounted the card feeding, analyzing, and stacking mechanisms; the accumulating mechanism, printing mechanism, and total taking mechanism. These various mechanisms are all driven by a single drive motor DM suspended from the underside of base 10 (Fig. 1). The motor DM also drives a generator designated G in Fig. 5 as by means of a silent chain 11 and sprocket 12 to supply low voltage current to the control circuits of the accounting machine. Since it is necessary that the generator deliver current at fairly constant voltage in order to ensure proper operation of the accounting machine, motor DM must not be permitted to vary in speed to a very marked degree. Therefore motor DM rotates continuously at constant speed while the machine is in use.

Secured to the shaft of motor DM are two drive pulleys 13, 14 (Figs. 1 and 2) of different diameters which are connected by belts 15, 16 to two driven pulleys 17, 18. The pulleys 17, 18 are mounted on ball bearings 19 (Fig. 3) which in turn are mounted on sleeves 20 loosely carried by a shaft 21. The latter is rotatably mounted in a gear housing 22 secured to the underside of base 10, the shaft being supported by ball bearings 23 set in the walls of the housing 22.

A sealing gland 22a is provided at the left hand end of housing 22 and a cover plate 22b at the right hand end to exclude dirt from the housing and prevent escape of the lubricant in the housing. Pinned to shaft 21 between the bearings 23 is a sleeve 24 formed with a driving worm 25 at approximately the mid-point of the sleeve. The worm 25 meshes with a worm wheel 26 secured to a shaft 27 supported by housing 22 at right angles to shaft 21. Shaft 27 drives the various mechanisms of the machine as in the above patent.

Secured to a flange 28, formed in shaft 21 near its left hand end between pulleys 17, 18 (Fig. 3), is a clutch disc 29. Secured to each side of the disc 29 is a clutch facing 29a of suitable friction material such as leather or any of the well-known asbestos compositions especially designed for use in friction clutches. Mounted on the ends of sleeves 20 which project outside of pulleys 17, 18 are ball thrust bearings 30 of conventional form which abut the inner ball races of the ball bearings 19. The outer ball races of the bearings 30 are engaged by shifter forks 31R and 31L. Secured to the faces of pulleys 17, 18 adjacent clutch disc 29 are discs 32 which have a running fit to shaft 21 to prevent the lubricant in bearings 19, 30 from getting on the clutch facings 29a and reducing their efficiency. Flanged housings 33 secured to pulleys 17, 18 protect the bearings 19, 30 against dirt and also serve to retain lubricant in these bearings. The housings 33 have a large opening concentric with shaft 21 to permit the forks 31R, 31L to directly engage the thrust bearings 30. The shifter forks at this point are provided with rounded lugs projecting through the openings in housings 33.

It is plain that movement of either fork 31L or 31R toward disc 29 will have the effect of pressing the corresponding pulley 17 or 18 firmly against the clutch facing of disc 29 with the result that shaft 21 will be driven slowly or fast as the case may be. By selectively actuating the forks 31R, 31L, the speed of shaft 21 may be changed at will.

The shifter forks 31R, 31L are controlled by mechanism best shown in Figs. 2 and 4 which is supported within a frame casting 34 secured to the underside of base 10. The casting 34 is provided with an offset vertical web 34a (Fig. 4) reinforced by two parallel side flanges 34b which join the lower box-like portion 34c to the horizontal portion 34d by which the casting is secured to the base 10. The web 34a and flanges 34b are offset to enable the box-like portion 34c to occupy a position between the upper and lower stretches of the belts 15, 16 and directly to the left (Figs. 1 and 2) of pulleys 17, 18. The box-like portion 34c of casting 34 is closed at the bottom by a plate 35 screwed to the edges of said box-like portion, while the right hand side (Fig. 2) is open so as to provide an open pocket confronting the pulleys 17, 18. This pocket contains the mechanism for selectively actuating the shifter forks 31R, 31L. A pin 36 is loosely mounted in vertically aligned holes in the casting 34 and plate 35 at the center of the open end of the pocket formed by the plate 35 and casting 34, the pin being kept in place by any suitable means such as cotter pins 37.

Loosely mounted on pin 36 is a casting 38 on the ends of which are mounted the shifter forks 31R, 31L by means of machine bolts 39 which pass through vertical holes in the casting 38. The left-hand ends of the shifter forks 31R, 31L, are provided with threaded holes into which are screwed stop screws 40 which abut the ends of casting 38. Riveted to the left-hand face of casting 38 is an armature 41 which is T-shaped in horizontal section (Fig. 2) with the vertical web forming the cross bar of the T riveted to casting 38, while the vertical web comprising the stem of the T is tapered slightly toward the left. Secured to the walls of casting 34 on opposite sides of the armature 41 are the coils and cores of two bipolar electromagnets generally designated CM1, CM2, respectively. The stop screws 40 are first adjusted so that both pulleys 17, 18 will run free when the armature 41 is centered in the gap between the poles of magnets CM1, CM2 with both shifter forks barely touching the outer races of the thrust bearings 30, and the bolts 39 are then drawn tight.

It is obvious from the foregoing description that energization of magnet CM1 will cause the assemblage of parts carried by casting 38 to pivot counterclockwise on pin 36 (Fig. 2) and the shifter fork 31L will press the pulley 17 firmly against the adjacent clutch facing 29a thereby causing the motor DM to drive shaft 21 at low speed. Similarly, energization of magnet CM2 will cause the shaft 21 to be driven at high speed.

The magnets CM1, CM2 will be termed clutch magnets and are selectively controlled to cause the machine to be driven at low speed when printing and at high speed when printing is not taking place. This control is entirely automatic and is effected by means of the circuits shown in Fig. 5.

In Fig. 7 the cards 50 are shown stacked in a magazine 51 mounted between the supporting plates 52. The usual follower weight presses the cards down in the magazine. A slot in the bottom of the magazine is proportioned to permit but one card at a time to be fed from the magazine. A picker 53 is adapted to grip the lowermost card of the stack and advance it through the slot. The picker is mounted on sliding member 54 carried in the grooves 55 in the frame of the machine. The sliding member 54 is provided with rack teeth meshing with a segmental gear 56 mounted on a shaft 57 and adapted to oscillate to move the picker back and forth. Shaft 57 is oscillated by a cam (not shown) so as to feed one card per cycle of the machine. When the card is advanced from the bottom of the stack is gripped between feed rollers 69 and fed by these rollers to the next set of feed rollers 70 which in turn feeds it between the plates 71, 72. The card is fed downwardly until it is stopped by a gate 73 mounted on arms 74 secured to shaft 75.

A cam (not shown) causes the gate 73 (Fig. 7) to move into the path of the card to stop it between the plates 71 and 72 and to rock counterclockwise to permit the card to pass out from between the plates later in the cycle. At such time feed rollers 80 and 80a will feed the card from between the plates 71 and 72. A curved guide plate will guide the leading edge of the card into cooperation with the clips of a rotary card stacker 81 mounted on a shaft 82. This stacker is well known in the art and need not be described in detail. The timing of the stacker is such that the clips are open to receive the card as it feeds downwardly over the guide plate. The clips then grip the card and pull it into the discharge pocket 85.

The inner feed rollers 80a (Fig. 7) are not positively driven but press the card against the outer rollers 80 which are positively driven. The rollers 80a are carried on arms which are loose on shaft 75 and which are provided with pins engaged by arms 87 which are fixed on shaft 75. Suitable springs attached to the lower ends of the roller arms tend to rock the rollers 80a against the card lightly. When the shaft 75 rocks to move the gate 73 to permit the card to be fed out, the arms 87 engage the arms carrying rollers 80a and press them firmly against the card to insure feeding thereof.

After the card 50 has been fed to the sensing position between the plates 71, 72 and stopped by the gate 73, it is sensed by groups of sensing pins 100 (Fig. 7) each group cooperating with four of the index positions of a column on the card and pins 100x, 100y cooperating with the remaining two index points of a column. Thus a set of pins 100, 100x, 100y is provided for each column of the card. There are two card fields, the upper field having six index point positions per column for recording alphabetic data, but the columns of the lower field have only four positions for recording numerical data. Consequently there are only two sets of pins 100x, 100y for the upper field. The sensing pins are guided at their forward ends in plate 72 and at their rear ends in plate 101 and also by an intermediate plate 102. Each pin is provided with a spring 103 pressing at one end against a collar secured upon the pin and at the other end against the plate 102. The springs thus tend to press the pins against the card and through the perforations therein. A restoring plate 104 engaging the collars on the pins is operated to restore the pins to the non-reading position of Fig. 7 and to be moved to the left to permit the pins to engage the card.

Mechanism is provided to translate the combinational hole readings obtained from the card into timed electric impulses which may be used to control the position of type bars for printing the character corresponding to the combinations of perforations on the card or to control the operation of accumulating mechanism adapted to receive these timed electric impulses. Each of the pins 100 corresponding to the lower four index positions of a column in both the upper and lower fields of the card 50 have secured thereto blocks 119 carrying pins which cooperate with spring pressed pivoted arms 120. The arms 120 cooperating with pins 100 for the lower field carry brushes 121d and 121b cooperating with a commutator 122 and brushes 121c and 121a cooperating with a commutator 123. The arms 120 cooperating with the lower four positions in the upper field, similarly have brushes 121a, 121b, 121c, 121d, of which the brushes 121a and 121c cooperate with a commutator 123 and the brushes 121b and 121d cooperate with the commutator 124. When the sensing pins 100 move into engagement with the card, those that register with perforations project through the card and rock their respective arms 120. The remaining pins which do not register with perforations in the card are stopped thereby and do not change the positions of their brushes with respect to the commutators.

The lower set of commutators 122 and 123 (Fig. 7) which cooperate with the pins 100 for the lower field are keyed to shafts 125 which make one revolution for each cycle of the machine. The commutators 123 and 124 associated with the upper field of the card are mounted upon shafts 128 which make four revolutions during each cycle of the machine for the purpose of controlling the alphabet printing type bars.

Associated with each of the brush carrying arms 120 are circular latching members 131 (Fig. 7). After the sensing pins 100 have taken their readings, cam means (not shown) causes the latching members 131 to rock slightly to release all of the arms 120 so that they may shift under control of the perforations in the card. Immediately after this shifting the latches 131 are returned to the position of Fig. 7 wherein they will latch all of the arms 120 that have been rocked by passage of the associated pins through perforations. In this manner the associated brushes are retained in shifted position while the pins 100 are retracted from the card.

After the card has been analyzed and the brushes 121a, 121b, 121c, 121d have been positioned in accordance with the holes in the card, their positions are analyzed by the commutators 122, 123, 124. These commutators are constantly rotating while the machine is in operation but the flow of current therethrough is controlled by certain contact devices which permit circuits to be established through the commutators only during type bar and accumulator positioning portions of the operation of the machine.

In a tabulating machine of this type, it is customary to arrange the cards being fed through the machine in groups and sub-groups and to accumulate the information contained thereon as totals of such groups and sub-groups. Automatic group control means are provided to detect when all the cards of a particular group have been sensed by the card analyzing instrumentalities and to automatically initiate totaling operations during which a total of such group may be printed upon the record sheet. To this end, the cards are usually perforated with a code number or other common symbol which appears on each card of a particular classification and the machine is adapted to transfer this code number from the first card of each group to a suitable storage device with which each suceeding card is compared. As long as the cards compare with the stored code number the machine will continue to accumulate. Upon sensing a change in the group number the machine will be controlled to either stop completely or perfosm total taking operations. The group control perforations may be punched in the upper field of the card to represent some numerical code number.

Referring now to Fig. 7, each of the arms 120 for the upper groups of pins 100 has its upper extremity rounded to cooperate with a slidable comb 430. Thus for each column of the upper field there are four such combs, one for each of the arms 120 for that column. The combs 430 are slidable horizontally on cross bars 431 mounted in a frame 432 which may be reciprocated in a vertical direction and is spring biased downwardly. Each comb is provided with a pair of projections 433 and an aligning projection 434. The pairs of contacts 435 are provided, each of which cooperates with a set of four combs 430. That is, for each column of pins 100, there is a corresponding pair of contacts 435.

A scissors device comprising bars 436 common to all the lugs 434 is provided which, when the bars are moved towards each other, cooperates with the projections 434 to move them into alignment. During each totaling operation, the frame 432 is moved vertically upward raising the combs 430 out of cooperation with the arms 120 and at the same time the bars 436 are actuated to move the combs 430 into alignment. In such aligned position the notches 433a, formed by projections 433 of each comb 430, are in cooperation with an angle 435b attached to the lower blade of the corresponding contacts 435, the relationship being as shown in Fig. 7. While the combs 430 are in their upper position, the pins 100 are permitted to sense the perforations in the card and shift the arms 120 in accordance with the arrangement of the perforations and the arms 120 are thereafter locked in such position by the latches 131. The frame 432 is then lowered to again bring the combs 430 into cooperation with the arms 120 in which lowered position they remain during succeeding card reading cycles and until a total cycle is again performed. It will be noted in Fig. 7 that the lower edge of each comb 430 is provided with two notches either of which may cooperate with the extremity of the associated arm 120, depending upon whether the arm is in one or the other of its alternative positions. Toward the end of each cycle, the arms 120 are released by the latches 131 and those arms which are moved by their pins 100 will be permitted to restore under the influence of their springs and by reason of their connection with the combs 430 will move their corresponding combs to the left.

During the next card cycle after a new card has been advanced to sensing position the pins 100 will again advance to read the perforations in the next card and in doing so will rock the arms 120, and such pins as are permitted to advance will cause movement to the right of their corresponding combs 430. If the same pins advance which went forward during the preceding cycle, the combs 430 which were moved to the left during the restoration of the arms 120 will be moved and the combs will again be in alignment.

Following such setting of the combs, the contacts 435, which are mounted on bars 437 pivoted at their ends, are tilted so that the angle plates 435c thereon move down into the notches 433a between projections 433 and contacts 435 remain open. If, however, the perforations on this succeeding card are not identical with those of the card which effected the comb set-up, a different combination of arms 120 will be rocked by the pins 100 and either a comb 430 which was previously moved to the left will fail to return, or another comb will be moved farther to the right. In either case, a projection 433 will either fail to move out of cooperation with an angle plate of a contact 435 or a projection is moved into cooperation with such angle plate. The subsequent tilting of the contacts 435 will find a group of combs 430 out of alignment so that the angle plate 435c of at least one pair of contacts 435 will be intercepted by a projection 433 and continued rocking of the bar 437 will cause closure of such contacts 435. Closure of the contacts 435, as will be more particularly pointed out in connection with the description of the electric circuit of the machine, controls the further operation of the machine to either stop or initiate a total cycle.

Figure 6:
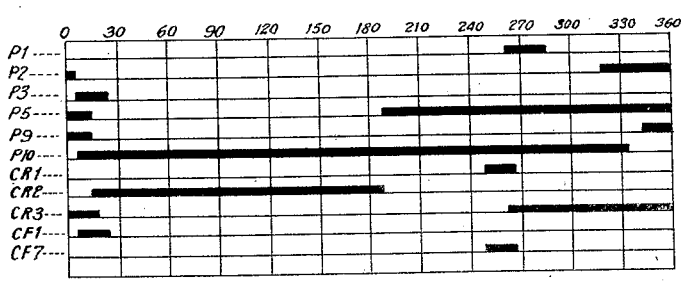
Fig. 6 is an electrical timing chart.
Figure 5:
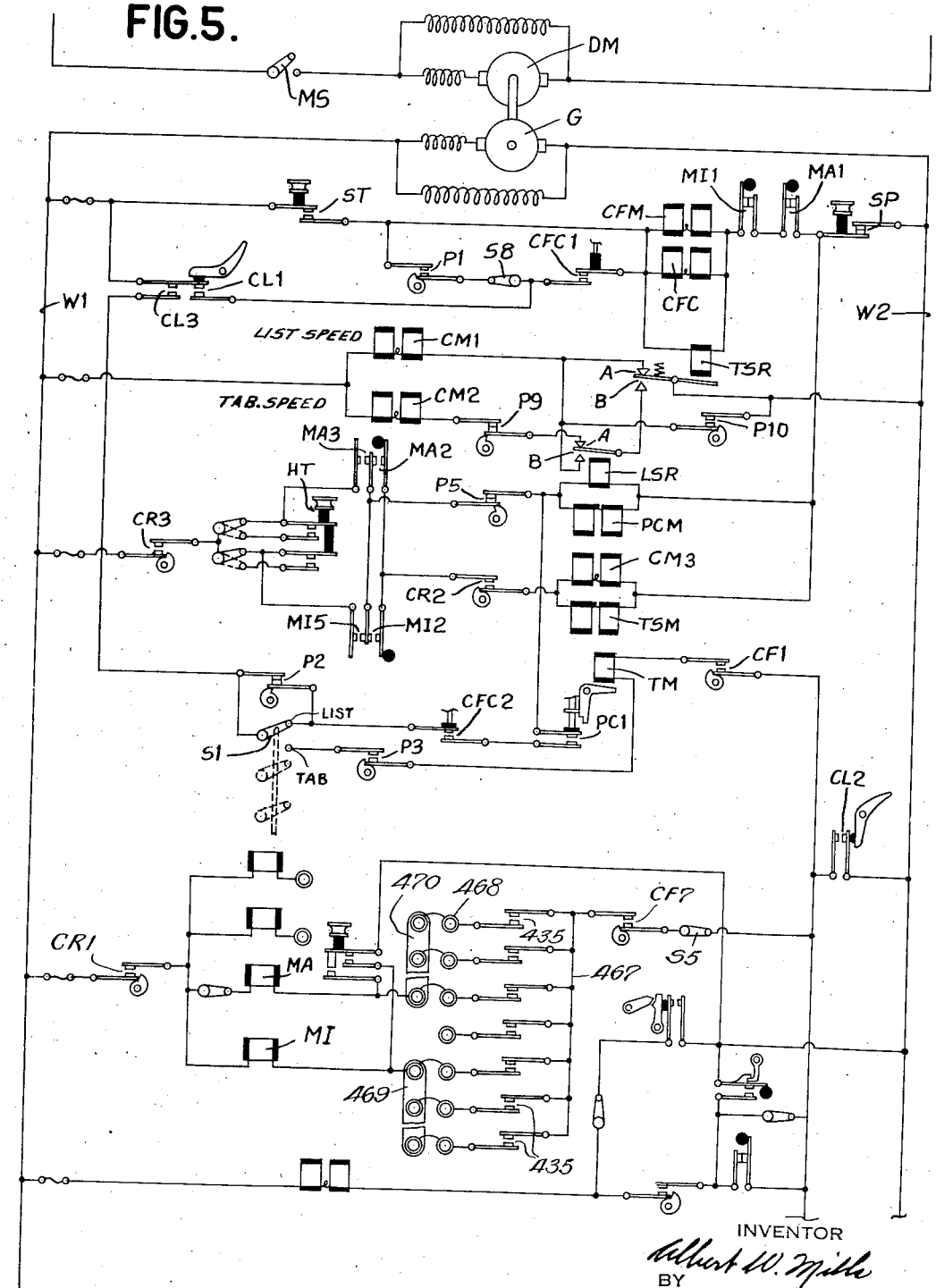
Fig. 5 is a circuit diagram.

In Fig. 5 the group control contacts 435 are diagrammatically represented as having one of their blades connected by common wire 467 while their other blades are connected to plug sockets 468. These plug sockets may be connected by suitable plug wires to groups of plug sockets 469 or 470. At the time in the cycle when the setting of the combs 430 is tested to determine whether there has been a change in the group number, if one of the contacts 435 within either group closes due to such change, it will complete a circuit as follows: from the line wire W2, through contacts CL2, switch S5, contacts CF7, to the common wire 467, thence through the contacts 435 which have closed, one of the plug wire connections 468, 469 or 468, 470, depending upon which of the plug sockets 469, 470 the particular contacts 435 have been connected to, thence through either of the magnets MA or MI, contacts CR1, to line wire W1. The contacts CF7 are card feed contacts operating only during card feeding operations and closed at the time in question. The contact CR1 is a continually running contact being mounted on a shaft which rotates continuously. The timing of these contacts is shown in Fig. 6.

If a group of contacts 435 are connected by plug wires to the common plug socket 469, a change in the group number recorded in the columns corresponding to these contacts will cause the minor relay MI to be energized and the machine will record a minor total. If the controlling circuit is closed through the common plug socket 470, it will cause major relay MA to be energized and initiation of a major total operation will take place which involves two cycles of the machine during the first of which the minor total is automatically recorded and this cycle is followed by the recording of the major total. The contact CR1 is timed to close for an instant after the contacts 435 have been fully tilted to sense the positions of the combs 430. At this time the contacts CF7 and the card lever contacts CL2 are also closed (Fig. 6) so that, if there is a disagreement in the group number, a circuit will be closed through either of the relays MA, MI.

The card lever contacts CL1, CL2 and CL3 are closed whenever a card is in position to be analyzed and remain closed during the continuous feeding of cards. A special card sensing pin 550 is provided (Fig. 8) which is adapted to advance with the pins 100. This special pin 550 is located so as to cooperate with a portion of the card in which no code perforations will ever appear. It is supported at one end by the restoring bar 104 and at its other by plate 102. A block 551 attached at an intermediate point on the pin has a pin and slot connection to an arm 552 secured to a rod 553 which extends to the outer side of the frame. At this point, rod 553 carries a spring pressed arm 554 which, through a link 555, is adapted to rock an interposer 556. If, upon advance of the bar 104, the pin 550 is stopped by the presence of a card 50, the slight movement of the pin 550 through the linkage described will permit the interposer 556 to move to the position of Fig. 8 where its free end lies under a projection 557 on a pivoted member 558. The interposer 556 is pivotally mounted on the end of a bell crank 560 which is rocked counter-clockwise to the position of Fig. 8 once per cycle of the machine by means not shown. Thus, if there is a card in position to be analyzed, interposer 556 will be rocked slightly clockwise and take a position underneath projection 557 and the subsequent counterclockwise movement of bell crank 560 will cause contacts CL1, CL2, CL3 to close.

If no card is in sensing position between the plates 71 and 72, the advance of pin 550 through plate 71 will locate the interposer in its dotted line position (Fig. 8) and the subsequent rocking of bell crank 560 will not have any effect on the contacts. The bell crank 560 cooperates with a pin 561 on a spring pressed latch 562 in such manner that, as the bell crank returns to its normal position by moving in a clockwise direction, the latch 562 will move beneath a projection 563 of the arm 558 to latch the contacts in a closed position. With the above construction the successive presentation of cards to the sensing pins will permit the continued closure of the contacts. Upon failure of a card to register with the pin 550, the latch 562 will be tripped by bell crank 560 and the contacts will open before the commutator reading devices have operated and no circuits will be established to the type bar magnets.

The circuits shown in Fig. 5, with the exception of the motor generator circuits and the control circuits for magnets CM1, CM2, are identical in function and mode of operation with those shown in Fig. 50a of Patent No. 1,944,667 aforesaid. Only a brief description of the well known circuits will be given herein such as will be sufficient to understand how speed control is effected by the present invention under various conditions of operation.

The machine is manually started in operation, as described in the Peirce patent, by first closing motor switch MS to start driving motor DM and then depressing start key ST. This closes a circuit as follows: Line wire W1, start key ST; card feed clutch magnet CFM, card feed contacts magnet CFC, and tabulating speed relay TSR in parallel; minor control contacts MI1, major control contacts MA1, and stop key contacts SP, to line wire W2. The energization of the card feed clutch magnet CFM, as described in the above patent, engages the one revolution clutch which permits the card feeding mechanism shown in Fig. 7 to be driven by motor DM, while the energization of magnet CFC directly closes certain contacts designated CFC1, CFC2 and at the same time engages a one-revolution clutch which permits a cam shaft to be driven by motor DM at the rate of one revolution for each card analyzed. This cam shaft operates certain contacts designated CF1 and others, as in the Peirce patent.

Start key contacts ST are kept closed manually throughout the first cycle and until after the second cycle has commenced. During the first cycle the usual card picker moves into a position to advance the first card from the magazine 51 and starts the card out of the magazine. During the second cycle the usual card feeding rollers carry the first card into the pin box and a reading is taken by pins 100, 100x, 100y of the holes in the card. This occurs during the last part of the second cycle. The card lever contacts CL1 to CL3 close while the reading is being taken. Closure of the card lever contacts during the second cycle establishes certain circuits before the end of such cycle as follows: Contacts CL1 establish a holding circuit for magnets CFM, CFC and relay TSR in parallel, through contacts CFC1 to line wire W1. With switch S1 closed for listing operation, contacts CL3 establish a circuit from line wire W1, through said contacts, switch S1, contacts CFC2 and PC1, magnet PCM and relay LSR in parallel, and contacts SP to line wire W2. Magnet PCM causes a one-revolution clutch to become engaged to permit motor DM to drive the printing mechanism during the third cycle as in the Peirce patent. It also causes a cam shaft carrying certain cams operating contacts P1, P2, P3, P5, P6, P9, P10 to rotate as in the Peirce patent. Magnet PCM also causes the contacts PC1, mentioned above, to close, this action taking place during a previous total cycle as described in the Peirce patent, the contacts being held in closed position by a latch released by magnet TM. The purpose of contacts PC1 is to cause the first card cycle after a total cycle to be a printing cycle when the machine is merely accumulating items and not listing them, in order to print the group number from the first card of each group.

It will be seen that during the first cycle and part of the second cycle, only relay TSR remains energized. The energization of relay TSR at the start of the first cycle establishes a circuit through tabulating or high speed clutch magnet CM2 as follows: Line wire W1, magnet CM2, contacts P9, contacts A of relay LSR, and contacts B of relay TSR, to line wire W2. This causes the motor DM to drive the machine at high or tabulating speed during the first cycle. However, during the last part of the second cycle the energization of relay LSR closes its contacts B and has the effect of neutralizing relay TSR so that magnet CM1 is energized through contacts B of relays LSR, TSR in series. Thus during the last part of second cycle motor DM commences to drive the machine at low speed through pulley 17 (Fig. 2). Since the magnet PCM is now energized, the third cycle will be a printing cycle to print the group number of items from the first card.

Contacts P9 open early in the third cycle and prevent energization of tabulating speed clutch magnet CM2. Cam contacts P10 close at about the same time and keep clutch magnet CM1 energized until near the end of the third cycle. Cam contacts P9, P10 are safety contacts which ensure that only list speed magnet CM1 will be energized during a cycle in which printing is effected and prevent possible damage to the machine which would be likely to result if the printing mechanism were driven at tabulating speed.

If the switch S1 is in the position of Fig. 5 or "list" position, the machine will list data from all cards and every cycle after the second will be a printing cycle and the motor DM will drive the machine continuously at slow speed. If the switch S1 is moved down to "tab." position to connect cam contacts P3 to line wire W1 through contacts CL3, the machine will be conditioned to list the group number of the first card of every group and accumulate without printing the data on the remaining cards of each group. This is known in the art as tabulating operation. Under these circumstances the first two cycles of the machine will be the same as described above, except that magnet PCM is energized through contacts P2 instead of switch S1. During the third cycle contacts P3 and CF1 will close and energize trip magnet TM by a circuit as follows: Line wire W1, contacts CL3, switch S1, contacts P3, magnet TM, contacts CF1 and CL2, to line wire W2. Magnet TM operates, as in the Peirce patent, to unlatch contacts PC1 to permit them to open. This opens the circuit for magnet PCM and relay LSR and prevents energization of printing clutch magnet PCM except during a total cycle or by the group control mechanism as described in the patent. Obviously list speed relay LSR also will be deenergized but this will have no effect during the third cycle as magnet CM1 is kept energized by contacts P10 until the end of the third cycle. Also contacts P9 do not close until after contacts P10 have opened so that magnet CM2 cannot be energized until near the end of the third cycle.

When contacts P9 finally close, contacts P10 will be in open condition, while contacts B of relay TSR and contacts A of relay LSR will be in closed condition (relay TSR not having been deenergized). Thus a circuit will be established as follows: Wire W1, magnet CM2, contacts P9, contacts A of relay LSR, and contacts B of relay TSR to line wire W2. Since the circuits to magnet PCM and relay LSR are all open due to contacts PC1, MA2, MI2, MA3, MI5 being open, the motor DM will drive the machine at high speed during the fourth and subsequent cycles of the first group.

The group control magnets MA, MI function, as described in the Peirce patent, to open contacts MI1, MA1 and close contacts MI2, MA2, MA3, MI5 during the last card cycle of each group to initiate total printing cycles. If the change in group occurs in the minor classification numbers, the various MI contacts will be operated by magnet MI as above while the magnet MA will operate the MA contacts if the change occurs in the major classification numbers. As described in the Peirce patent, on a major change the MI contacts also operate automatically when a change occurs in the major classification numbers. Whichever type of change takes place, during a given cycle, contacts CR3, MA3 and/or contacts MI5 will close and energie magnet PCM and relay LSR. Also contacts MI1 and/or MA1 will open to deenergize magnets CFM, CFC, and relay TSR. Contacts A of relay TSR close to energize clutch magnet CM1 and contacts B will open to deenergize magnet CM2. This causes the speed to change from high to low during the last card cycle of a group in readiness for commencing the total printing cycle which is to follow. Relay LSR is energized but has no effect at this time as its normal function is taken over temporarily by contacts A of relay TSR. Contacts CR3 remain closed until the total printing cycle has commenced and ensure that magnet PCM will be energized at the point where the one revolution clutch which it controls would normally be disengaged automatically.

Contacts CR3, through contacts MI2, MI5 and/or contacts MA2, MA3, and contacts CR2 also energize total switch magnet TSM and a clutch magnet CM3 which have the functions described in the Peirce patent, of initiating and controlling total taking operations.

During the total cycle which follows the last card of a group, contacts PC1 will be reclosed as described in the Peirce patent and condition the machine for a printing cycle under control of the first card of the next group. Also, providing switch S8 is closed, cam contacts P1 will close during the latter part of the total cycle to automatically reenergize magnets CFM, CFC, and relay TSR, the circuit being as follows: Line wire W1, contacts CL1, switch S8, contacts P1; magnets CFM, CFC, and relay TSR in parallel; contacts MI1, MA1 (which are restored to closed position during the total cycle), and contacts SP, to line wire W2. Contacts CFC1 will close to maintain the circuit just described after contacts P1 have reopened, and CFC2 also will close. The contacts P2 close near the end of the total cycle and remain closed until after the next cycle has commenced thus preventing the printing clutch controlled by magnet PCM from disengaging at its normal point of disengagement. Relays LSR and TSR will be energized closing their contacts B to maintain magnet CM1 in energized condition. Thus, the machine will be driven at low speed by motor DM during the cycle which follows the total cycle whereby to list the data from the first card of the next group.

When it is desired to stop the machine temporarily or when the machine stops automatically as a consequence of the cards becoming exhausted, stop contacts SP are operated by hand or contacts CL1 fail to close due to lack of a card in analyzing position. This causes relay TSR to become deenergized closing the contacts A of said relay with the result that the main drive shafts of the machine will idle at listing speed due to energization of magnet CM1. Also the machine will begin to idle at listing speed when switch MS is closed prior to commencing operations with the machine.

While there has been shown and described and pointed out the fundamental novel features of the invention as applied to a single modification it will be understood that various omissions and substitutions and changes in the form and details of the device illustrated and in its operation may be made by those skilled in the art without departing from the spirit of the invention. It is the intention, therefore, to be limited only as indicated by the scope of the following claims.

What is claimed is:

1. In a record controlled machine, record analyzing means, means to feed records into a position to be analyzed by the analyzing means, means to detect the arrival of a record at the analyzing position, a motor for driving the feeding means; means for coupling the motor to the feeding means comprising multi-speed driving means including two clutches and means to selectively engage said clutches to select either of two different operating speeds, a pair of actuators for the last named means, each of said actuators being associated with one of the clutches and, when operated, actuating the engaging means to cause the associated clutch to become engaged; a pair of control elements for said actuators, each element having a connection to one of said actuators and each capable of establishing a connection to the other of said elements for selecting the other of said actuators, one of said elements being normally in a condition to render the actuator for a given speed operative to cause the machine to idle at the given speed, and, when operated, selecting the other actuator to cause the record feeding means to operate at another speed, the second control element having a connection to the first element whereby the second element, when operated, changes the control exercised by the first element to the extent of causing the record feeding means to operate at the given speed when the first element is in a condition to cause the machine to operate at the other speed; means to start the feeding of records to the analyzing position having a connection to the first element to cause same to be operated and thereby select the other speed of the multi-speed driving mechanism whereby to initially operate the feeding means at the other speed, and means connecting the detecting means with the second element whereby, when a record reaches the analyzing position, the second element is operated to cause the feeding means to operate at a given speed.

2. In a machine controlled by accounting and statistical records, record sensing means, means to feed records to the sensing means, means to detect the arrival of a record at the sensing means, two-speed clutch means to drive the feeding means at different speeds during listing and non-listing cycles, respectively; a pair of electric actuators for operating the clutch means to determine the speed at which the feeding means is driven, circuits for said actuators, a relay operable to initially select the circuit of a predetermined one of the actuators to cause operation of the feeding means at a non-listing speed, a control circuit for said relay including means to initiate operation of the machine; and a second control circuit including a second relay controlled by the detecting means for selecting the circuit for the other of said actuators and breaking the circuit for the predetermined actuator to cause a cycle of operation of the feeding means at listing speed when the first record is in a position to be analyzed.

3. In a machine of the class described, a multi-speed driving mechanism for driving the machine at a plurality of different speeds, means to initiate operation of the machine, means controlled by the initiating means for controlling the multi-speed driving mechanism to cause initial cycles of the machine necessary to bring the first record into analyzing position to be effected at high speed, record detecting means rendered effective by the arrival of the records at an analyzing position, means controlled by the record detecting means for rendering the second named means ineffective and for causing the multi-speed driving mechanism to drive the machine at a lower speed after the first record reaches analyzing position, means to automatically control the last named means to cause the machine to resume operations at high speed after the record has left the analyzing position; means to sense changes in group designations in the record, and means controlled by said group change sensing means for controlling the means controlled by the initiating means to cause the machine to be driven at the low speed during the cycle following a change of group designations.

4. In a machine of the class described, record analyzing means, means to feed records into a position to be analyzed by the analyzing means, means to drive the feeding means at two different speeds, a pair of electric actuators for controlling the driving means to select the speeds at which the machine is driven, one of said actuators causing the machine to be driven at a high speed and the other at a low speed, means to initiate operation of the machine, a relay controlled thereby to automatically select the high speed actuator whereby initial cycles of the machine necessary to bring the first record into analyzing position are effected at high speed, means to detect the arrival of a record at the analyzing position, a second relay controlled by the detecting means to select the other of said actuators to cause the machne to be driven at low speed after the first record reaches analyzing position and operable to select the other actuator to cause the machine to be driven at high speed, and means automatically operative after the first record has left the analyzing position to control the second relay to cause the latter to select the high speed actuator whereby the machine operates at high speed after the first record leaves the analyzing position.

5. In a machine of the class described, a record analyzing station having means to sense data designations in the controlling records and means to detect the arrival of a record at the analyzing station, means to feed each record to the analyzing station; multispeed driving means for the feeding means, including a plurality of speed selecting devices, each device causing the feeding means to be driven at a speed different from the other device; means to selectively control a certain one of the devices to determine the speed at which the feeding means operates, means to initiate operation of the machine and for controlling the selecting means to cause the initial cycles necessary to feed the first record to the analyzing position to be effected at a predetermined speed, and means controlled by the record detecting means when the first record reaches the analyzing position for rendering the selecting means ineffective to select the certain one of the speed selecting devices and for causing selection of the other speed selecting device, whereby the feeding means is driven at a different speed after the first record reaches the analyzing position.

ALBERT W. MILLS.